Figure 2:
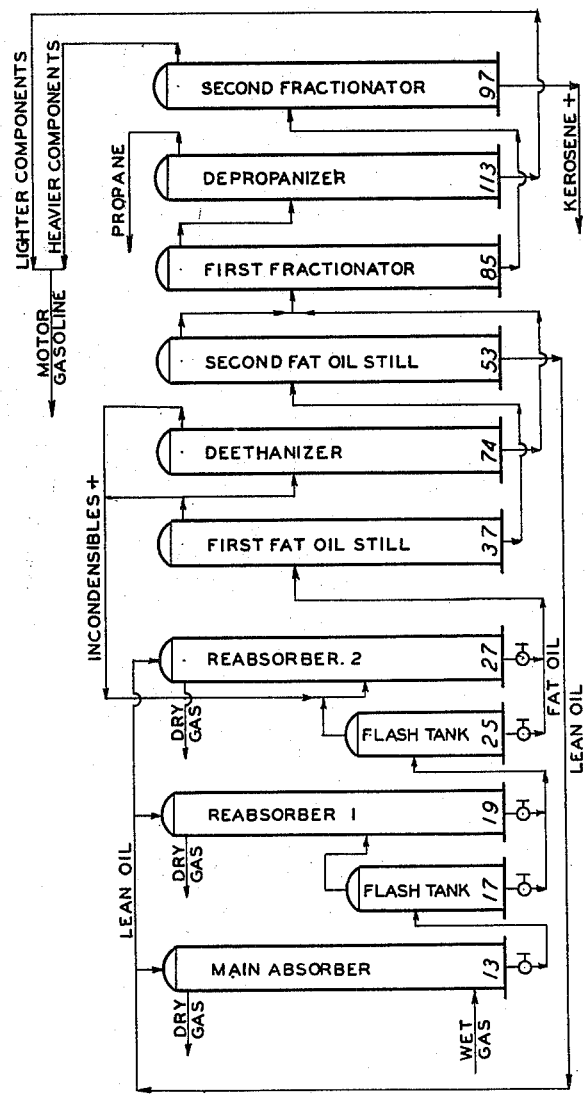

Sept. 26, 1950 J. J. WEATHERBY 2,523,747
RECOVERY OF GASOLINE FROM ENRICHED ABSORBER OILS
Filed April 26, 1947 4 Sheets-Sheet 1
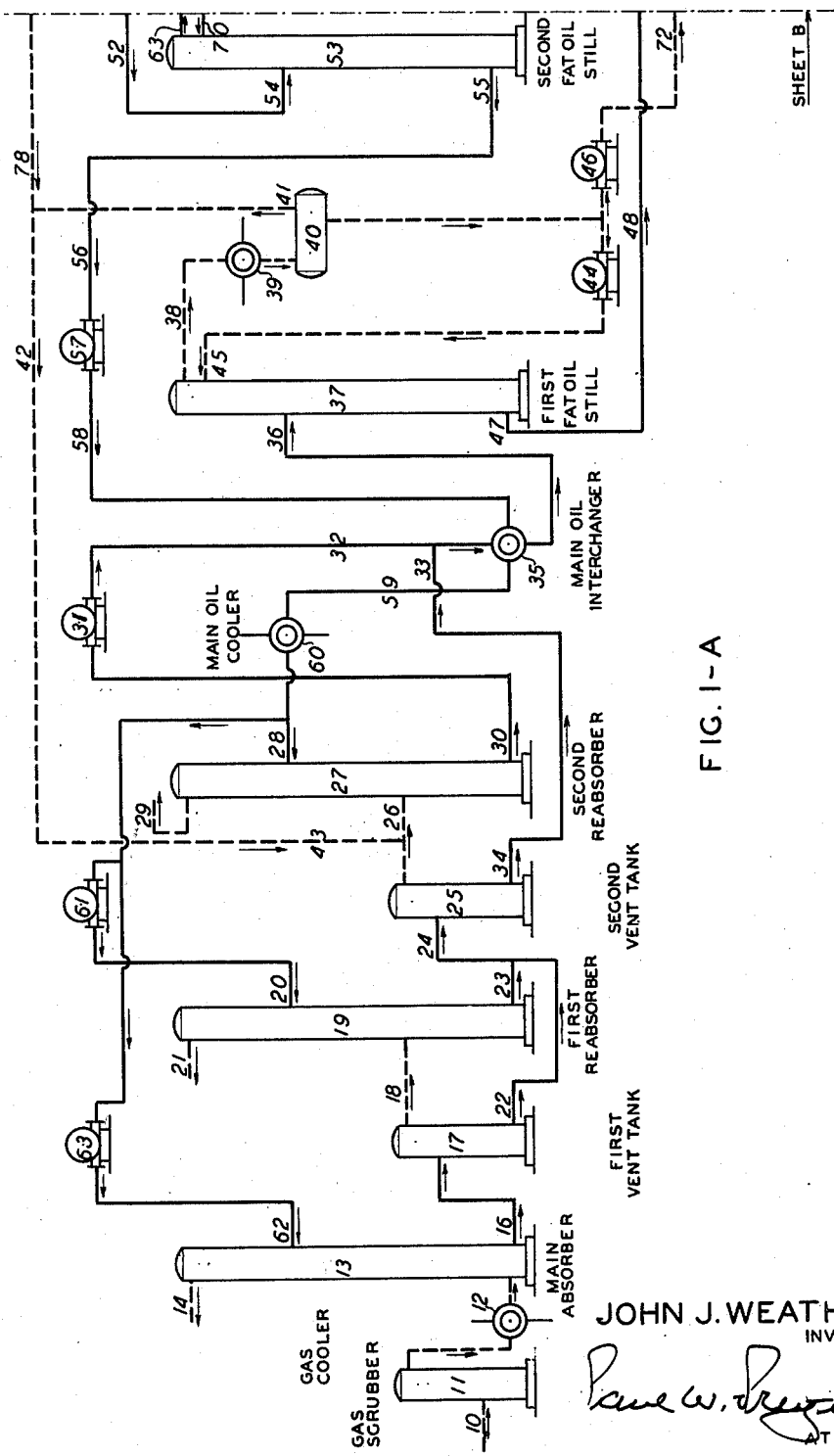
FIG. I-A
JOHN J. WEATHERBY
INVENTOR
ATTORNEY

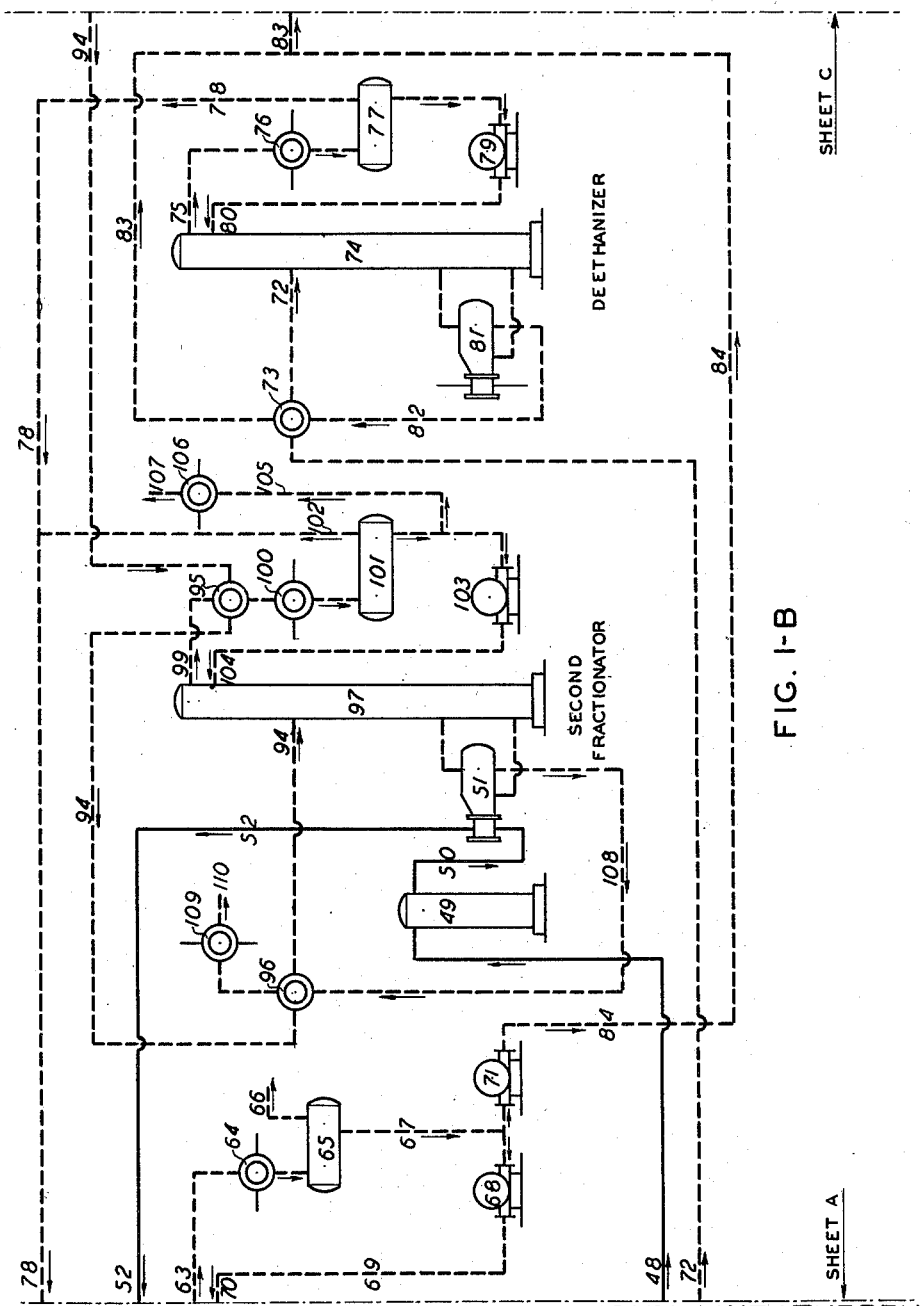

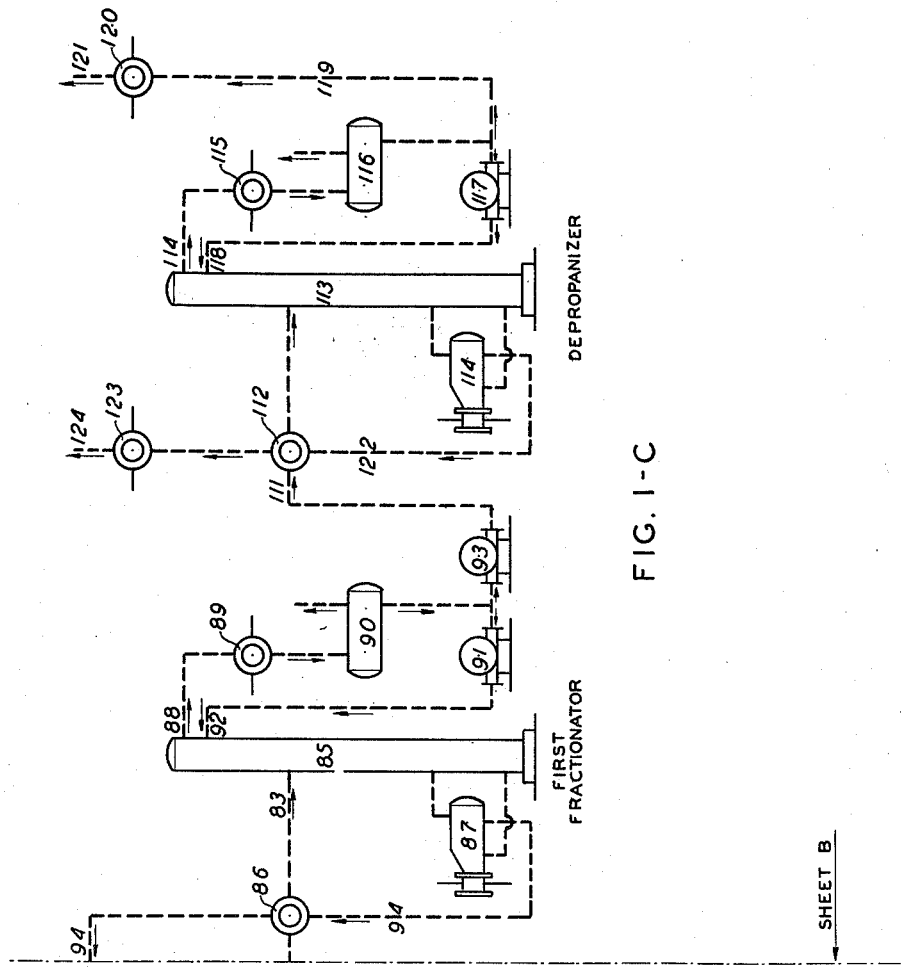

Patented Sept. 26, 1950

2,523,747

UNITED STATES PATENT OFFICE 2,523,747

RECOVERY OF GASOLINE FROM ENRICHED ABSORBER OILS

John J. Weatherby, Denver, Colo., assignor to The Stearns-Roger Manufacturing Company, a corporation of Colorado Application April 26, 1947, Serial No. 744,198

1 Claim. (Cl. 196—8)

This invention relates to the absorption of liquid hydrocarbons from wet natural gas and particularly to a method of separating the absorbed liquids from the absorber oil and from the incondensible gas which is dissolved at high pressures.

In the application of absorption to the gas produced from so-called condensate wells, it is ordinarily advantageous to contact the absorber oil with the gas at very high pressures, of the order of 1500 pounds to 2000 pounds per square inch. At such pressures the absorbing oil dissolves not only the hydrocarbons—propane and heavier—which are liquid or may be liquefied at atmospheric temperature, but also great quantities of ethane and methane. These gases are often termed incondensible as, while they may be liquefied under refrigeration, they cannot be brought to the liquid form at atmospheric temperature other than by solution in higher boiling liquids.

Vapor pressure specifications for motor gasoline do not admit the presence of propane, but for this liquid there is a large and increasing demand. Methane and ethane are, so far as any large quantities are concerned, useful only as fuel in the gaseous form, and it therefore becomes necessary to eliminate them from the desired liquids with the least possible loss of propane and at the smallest cost for plant and operation.

The most approved present practice in the handling of the enriched (fat) oil resulting from contacting at high pressure (as for example, at 1800# absolute), is to reduce the pressure on the fat oil in stages, as for example to 1000#, 200#, 50# and (in some cases) to as low as 16# absolute, each stage of pressure reduction flashing off part of the dissolved incondensibles along with some of the more volatile dissolved liquids, and to contact the gas-vapor mixture from each stage with fresh absorber oil. By this procedure the incondensibles remaining in the fat oil after the last expansion are reduced to a small proportion and the greater part of the condensible liquids are recovered in the reabsorption steps.

In the present practice the enriched oils from all of the absorbers are brought together in a single stream which is submitted to two stages of distillation or, more accurately, of stripping. In the first stage the operating conditions are so adjusted as to strip out all of the motor gasoline, down to a desired end point, the resulting distillate being fractionated in three successive operations to yield residues of motor gasoline, butane and propane respectively, the incondensibles being carried through these three operations to be separated as an overhead in the final or depropanizing column. In the second stage of stripping, all remaining absorbed liquids heavier than motor gasoline are removed, the residue being a reconstituted "lean" absorber oil, ready for reuse on cooling to a suitable temperature.

The extent to which this conventional practice is departed from in the practice of the instant invention will be evident on inspection of the attached drawings and the following description thereof, in which Fig. 1 is a diagrammatic representation of the plant required for the practice of the invention, various elements of apparatus being indicated by symbols commonly used in the industry, this drawing being in three sheets to be arranged end to end, and Fig. 2 is a flow sheet of the operation, omitting all details of pumping, condensing, separating etc. and showing only the flows of fluids through the cycle.

Referring first to Fig. 1, wet natural gas at a high pressure, for example 1800# per square inch, enters the system at 10, is separated from any accompanying liquids in a trap or scrubber 11, and, if necessary, is reduced to approximately atmospheric temperature in a cooler 12. The gas then passes, without reduction in pressure, through an absorber 13 in which it is deprived of liquefiable components by contact with an absorber oil entering at 62, the stripped, dry gas leaving the system at 14.

The stream of enriched or "fat" oil leaving the absorber at 16 contains large amounts of dissolved methane and ethane in addition to the desired propane and heavier hydrocarbons. It is next passed into a flash tank 17 maintained at a lower pressure, as for example 1000# per square inch, in which the pressure reduction causes a considerable amount of dissolved gas to be set free. This gas, which carries with it some quantity of desired liquids, passes at 18 to a reabsorber 19, maintained at the same pressure, in which it is contacted with fresh absorber oil entering at 20, the dry stripped gas leaving the system at 21.

The residual oil leaving the first flash tank at 22 and the fat oil leaving the first reabsorber at 23 are delivered at 24 into a second flash tank 25 maintained at a still lower pressure, as for example at about 250# per square inch absolute. The gas and vapor separating from the oil in the second flash tank pass at 26 into a second reabsorber 27, maintained at a somewhat lower pressure, as for example 200# absolute, which also receives wet gases separated at two later points in the process. This absorber is supplied with fresh absorbing oil at 28, the stripped, dry gas leaving the system at 29.

The enriched oil leaving the second reabsorber at 30 is passed by a pump 31 into a conduit 32 in which it is joined at 33 by the stream of flashed oil leaving the second flash tank at 34. The conjoined streams, which now contain all the desired liquids removed from the gas as well as material proportions of methane and ethane, pass to a heat interchanger 35 in which the fat oil is heated to about 425° F. by interchange against hot oil returning from a subsequent operation and is then passed as at 36 into the first fat oil still 37.

The first fat oil still is operated at a pressure intermediate between that carried in the second flash tank and that carried in the second reabsorber, for example 220# absolute, and under such conditions as to remove all of the methane and ethane from the fat oil, together with most of the propane and the lighter portion of the gasoline. For reasons which will appear, this need not be a close fractionation but is rather a simple stripping operation, using a small quantity of open steam, the only essential being that no hydrocarbons of too high boiling point to enter into a gasoline of the desired end point be carried over.

The overhead leaving the still at 38 contains too large a proportion of methane and ethane to condense completely with water cooling and after passage through condenser 39 the stream enters a separating tank 40. The incondensible gas leaving the separator at 41 contains a material proportion of propane and usually some liquids of even high boiling point, and is therefore passed through conduits 42 and 43 to enter the second reabsorber 27 along with the vent gas from the second flash tank 25.

The condensate collecting in tank 40 is in part returned by a pump 44 to the still as reflux liquid, entering the tower at 45. A relatively small supply of reflux liquid is required as the sole necessity is to hold back any vapors too heavy to belong in the gasoline. The remainder of the condensate is directed by a pump 46 to a deethanizing operation later described.

The partially stripped fat oil, now containing part of the gasoline and all higher boiling constituents, leaves the first fat oil still at 47 and flows through conduit 48 to a fired oil heater 49 in which it is raised to a temperature of the order of 550 to 600° F. The hot oil passes through conduit 50, the tubes of a reboiler 51 later referred to and a conduit 52 to the second fat oil still 53 which it enters at 54.

This still, which removes the remainder of the gasoline and all heavier liquids absorbed from the wet gas, is operated at about 25# absolute with a bottom temperature about 505° F. and a top temperature about 315° F. and is supplied with steam in the usual manner. The residue from this second stripping operation, a completely stripped and regenerated absorber oil, leaves the still at 55, passes through conduit 56, pump 57 and conduit 58 to the main oil interchanger 35 in which it is partially cooled in preheating the fat oil stream flowing toward primary still 37. The regenerated absorber oil then passes through conduit 59 to a water-cooled heat exchanger 60 in which it is brought back to a suitable temperature, say 95° F., and is used to supply fresh oil to the second reabsorber at 28, to the first reabsorber at 20 by way of a pump 61 and the main absorber at 62 by way of a pump 63. This completes the absorbing oil circuit.

The overhead vapor leaving the second fat oil still at 63 is condensed at 64 and the product delivered into a tank 65 which is vented at 66, under normal operation no gas leaves the system at this point. A portion of the condensate collecting in this tank is drawn through conduit 67 by a pump 68 and delivered through conduit 69 to the still at 70 as reflux liquid. A fairly sharp cut is made in this still and the normal quantity of reflux liquid is required. The condensate not returned to the still is delivered by pump 71 to a fractionator later described.

Returning now to the stream of first fat oil still condensate delivered by pump 46, this stream passes through conduit 72 and a heat interchanger 73, in which it is heated to about 210° F., to a deethanizing column 74. This column may be operated at about 500# absolute with a bottom temperature of about 285° and a top temperature of about 135° F. The vapor leaving this column at 75 is cooled to about 95° F., or lower where feasible, in a water-cooled condenser 76 and delivered into a separating tank 77. From this tank the incondensible gas, carrying some propane and even light gasoline hydrocarbons, passes through conduit 78 to a point of junction with conduit 42, thus returning to the second reabsorber at 26.

The elimination of the heavier part of the gasoline and all heavier hydrocarbons from the deethanizer charge stock correspondingly reduces the bottom temperature required for any given operating pressure, resulting in economy of heat and of reflux requirement.

All of the condensate collecting in separator 77 is returned to the top of the column, as at 80, by a pump 79. The bottoms from the column, which is heated by reboiler 81, pass through conduit 82, interchanger 73 and conduit 83 to the first fractionator 85, which also receives the overhead condensate from the second fat oil still, delivered to it by pump 71 and a conduit 84.

The feed to this fractionator passes through a heat interchanger 86 in which it is heated to about 250° F. This column, which is heated by a reboiler 87, may be operated at about 125# absolute, with a bottom temperature of about 400° and a top temperature of about 165° F. The overhead leaving this column at 88 is reduced to about 130° F. in a water-cooled condenser 89, the liquid collecting in tank 90 consisting of lower boiling hydrocarbons from gasoline down to and including propane and being free from methane and ethane. This liquid is in part returned by pump 91 to reflux the column as at 92 while the remainder of the condensate is delivered by pump 93 to a depropanizing column later described. The fractionation produced in column 85 need not be sharp and the circulation of reflux liquid is held to a low minimum.

The bottoms from the first fractionator, now free from hydrocarbons ranging from propane to pentane inclusive, and containing the heavier components of the gasoline, together with naphtha, kerosene and all higher boiling hydrocarbons, pass through conduit 94 and interchangers 95 and 96 to the second fractionator 97, entering this column at about 295°. This column, which is heated by reboiler 51, may be operated at a top temperature of about 290° F. and a bottom temperature about 480° F. and at substantially atmospheric pressure.

The overhead leaving the column at 99 passes through interchanger 95 and thence through a water-cooled condenser 100 into a separating tank 101. This tank is vented through conduit 102 to the atmosphere, the overhead from this column being free from incondensibles.

The second fractionator must make a sharp cut between the lower end of the gasoline and the higher boiling fractions which go into kerosene distillate, and a normal quantity of the distillate collecting in tank 101 is returned by pump 103 as reflux liquid at 104. The remainder of the condensate, being the heavier gasoline fraction, passes through conduit 105 and a cooling element 106 and leaves the system at 107. The bottoms from this column, consisting of kerosene and any higher boiling hydrocarbons, pass through conduit 108 to heat interchanger 96 and a cooling element 109 and leave the system at 110.

The portion of the overhead from first fractionator 85 not required for refluxing the column is delivered by pump 93 through conduit 111 and a heat interchanger 112 to the depropanizing column 113, entering at about 180° F. This column, which is heated by a reboiler 114, may be operated at a bottom temperature of about 212° and a top temperature of about 105° F., the operating pressure being about 210# absolute. The overhead leaving the column at 114 is condensed at 115 and delivered into a tank 116. This column need make only a cut in the normal butane fraction, so as to yield a gasoline of desired vapor pressure, and a relatively small quantity of condensate is returned by pump 117 to reflux the column as at 118. The balance of the condensate, which is ordinarily a mixture of propane and butane, passes through conduit 119 and an aftercooler 120 and leaves the system at 121.

The bottoms from the depropanizer, comprising all or part of the butanes (according to the composition of the gas and the vapor pressure specification for the gasoline) together with the somewhat heavier hydrocarbons which constitute the lighter end of the gasoline, pass through conduit 122, heat interchanger 112 and an aftercooler 123 and leave the system at 124.

As a final step, the heavier gasoline components delivered at 107 and the lighter components delivered at 124 are blended to produce a gasoline of desired vapor pressure and end point.

It will be understood that the temperature and pressure conditions above recited are intended to be suggestive only and that they will be varied with differences in composition of the wet gas and in gasoline specifications as to vapor pressure and end point. The general method of operation will not be changed other than to meet a possible necessity for segregating part or all of the butanes, to meet vapor pressure specification or a demand for this commodity.

This operating cycle may be summarized briefly with reference to Fig. 2, which omits confusing details and in which the absorbers and stills have the same reference numbers as in Fig. 1.

The absorber oil, after contacting the wet gas at high pressure in main absorber 13, is flashed down to about 200# pressure in two stages of pressure reduction, the flashed-off gas being again contacted with fresh lean oil to absorb any condensibles carried out in the evolved gases. The vent gases from the three absorbers pass out of the system. This is conventional practice.

The second reabsorber also receives incondensible gases carrying light condensible vapors from the first fat oil still 37 and from the deethanizer 74. This recycle of relatively small quantities of light liquids between the first stage of stripping and the second stage of absorption avoids the usual necessity for a third (and often a fourth) stage of pressure reduction, eliminates at least one absorber from the plant, and materially reduces the quantity of absorber oil circulated. This reduction in oil circulation usually amounts to about 15% of the amount formerly used and is a major factor in operating economy.

The combined enriched (fat) oils are partially stripped in the first fat oil still, this still being so controlled as to take off a "sloppy" or loosely fractionated cut including all the incondensibles and only the top of the gasoline. This is a radical departure from prior practice in which the end point of the gasoline is controlled by the regulation of this still, the entire gasoline cut and all lighter fractions being brought over. The possibility of cutting at midpoint in the gasoline and without any attempt at sharp fractionation is made possible by the provision for reabsorption of liquids from the incondensibles and by the provision for a final adjustment of the end point of the gasoline in fractionator 97.

The ability to make only a loose fractionation in the first fat oil still makes a material saving in operating cost by greatly reducing the amount of reflux liquid required, correspondingly reducing the quantity of steam required to vaporize the reflux and the cooling effect required to condense it. The steam consumption of the first fat oil still is less than one-fourth that required when an end point gasoline cut is being taken over, and this saving is not offset by any increase in steam required by the second fat oil still, which ordinarily is somewhat below the normal consumption by reason of the fact that it operates at substantially atmospheric pressure.

The overhead from the first fat oil still is deethanized, finally removing the incondensibles which are returned to the second reabsorber for recovery of any desired liquids. It is not necessary to make a sharp cut between ethane and propane, though it is necessary to eliminate all methane and ethane, and it is desirable to hold the quantity of recycled propane within reasonable limits in order to minimize the load on the second reabsorber.

The bottoms from the deethanizer together with the overhead from the second fat oil still pass together to the first fractionator 85. The second fat oil still 53 gives an overhead free from incondensibles and containing the heavier portion of the gasoline and all higher boiling hydrocarbons absorbed from the wet gas. The bottoms from this still are regenerated, lean absorbing oil and as this circulates continuously in the system it is not requisite to make a sharp separation between distillate and absorber oil, this being true also in conventional operation. The steam consumption of this somewhat less than normal by reason of the low operating pressure.

The first fractionator yields an overhead containing propane (free from incondensibles) and the lighter part of the gasoline, and as the residue also contains part of the gasoline a close fraction is not required. The overhead passes to the depropanizer 113 which yields a mixture of butanes and propane as an overhead and gasoline components as a residue. Close fractionation is not necessary. The residue of light gasoline components is withdrawn. The bottoms from the first fractionator pass to the second fractionator 97. From this fractionator the heavier gasoline components are taken off as an overhead, kerosene and any heavier components forming the residue. A moderately close fractionation is required to obtain maximum gasoline yield at any given end point.

The manner in which the distillate from the second fat oil still together with the residue from the deethanizer are fractionated to desired products is not limited to the exact steps shown, it being possible, for example, to effect the separation in a single tall column taking propane overhead, gasoline as a side stream and kerosene as a bottom fraction. Such procedure is not recommended but is a possible alternative to the three-stage fractionation shown. Further, as wet gases differ in composition and market demands vary, the final products may be any or all of the possible products, viz.: propane, butanes, gasoline and kerosene, gasoline being the primary product in each case.

The savings in plant and operation realized in the use of the new cycle instead of the old in a typical plant treating 200 million cubic feet per day of wet gas at 1800# pressure are illustrated in the figures below:

|  | New Cycle | Old Cycle | Saving | Percent |
|---|---|---|---|---|
| *Plant* | | | | |
| Steel vessels, tons | 503 | 541 | 38 | 7 |
| Heat exchange surface square feet | 96,000 | 104,000 | 8,000 | 8 |
| *Operation* | | | | |
| Oil circulation, g. p. m | 1,566 | 1,821 | 255 | 14 |
| Condenser heat load in mm. B. t. u | 107 | 137 | 30 | 22 |
| Steam consumption, pounds per hour | 50,657 | 70,500 | 19,843 | 28 |

I claim as my invention:

The method of separating desired products from an absorber oil enriched in gasoline components and in hydrocarbons lighter and heavier than gasoline which comprises: stripping from said enriched oil a first top cut containing lighter gasoline components and hydrocarbons lighter than gasoline; stripping from the partially stripped absorber oil a second top cut containing heavier gasoline components together with hydrocarbons heavier than gasoline; separately collecting said top cuts as liquids substantially free from absorber oil; fractionally distilling said first top cut and thereby removing methane and ethane therefrom; mixing the residue from said fractional distillation with said second top cut; fractionally distilling the resultant mixture to produce a third top cut consisting of lighter gasoline components and propane and a residue consisting of heavier gasoline components together with hydrocarbons heavier than gasoline; fractionating said third top cut to separate propane from said lighter gasoline components; fractionating said residue to separate said heavier gasoline components from hydrocarbons heavier than gasoline, and blending said separated lighter and heavier gasoline components to produce a stable gasoline.

JOHN J. WEATHERBY.

REFERENCES CITED

The following references are of record in the file of this patent:

UNITED STATES PATENTS

| Number | Name | Date |
|---|---|---|
| 1,972,060 | Cole et al. | Aug. 28, 1934 |
| 2,157,343 | Mateer et al. | May 9, 1939 |
| 2,271,761 | Coulter et al. | Feb. 3, 1942 |
| 2,333,229 | Barton | Nov. 2, 1943 |
| 2,386,057 | Noble | Oct. 2, 1945 |
| 2,388,102 | West | Oct. 30, 1945 |
| 2,409,691 | Noble | Oct. 22, 1946 |

OTHER REFERENCES

Reid: "Refiner and Natural Gasoline Manufacturer," vol. 20, No. 4, April 1941, pages 55–63.

Braun: "Refiner and Natural Gasoline Manufacturer," vol. 11, No. 2, Feb. 1932, pages 192–195.

Wheeldon et al.: "The Petroleum Engineer," vol. 12, Nov. 1940, pages 125, 126, 128, 130, 132–134.